(12) United States Patent
Rausch et al.

(10) Patent No.: US 9,548,068 B1
(45) Date of Patent: Jan. 17, 2017

(54) DETERMINING OPTICAL DEGRADATION IN A HEAT-ASSISTED READ/WRITE HEAD

(71) Applicant: Seagate Technology LLC, Cupertino, CA (US)

(72) Inventors: Tim Rausch, Farmington, MN (US); Drew Michael Mader, Bloomington, MN (US); Alfredo Sam Chu, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/854,279

(22) Filed: Sep. 15, 2015

(51) Int. Cl.
*G11B 5/00* (2006.01)
*G11B 5/455* (2006.01)
*G11B 5/012* (2006.01)
*G11B 7/1267* (2012.01)
*G11B 5/60* (2006.01)
*G11B 5/31* (2006.01)
*G11B 19/04* (2006.01)

(52) U.S. Cl.
CPC ............ *G11B 5/012* (2013.01); *G11B 5/3189* (2013.01); *G11B 5/455* (2013.01); *G11B 5/6088* (2013.01); *G11B 7/1267* (2013.01); *G11B 19/041* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,249,392 B1 | 6/2001 | Sacks et al. | |
| 7,119,537 B2 | 10/2006 | Che et al. | |
| 7,633,694 B2 | 12/2009 | Alex et al. | |
| 8,138,754 B2 | 3/2012 | Ogawa et al. | |
| 8,179,624 B2 | 5/2012 | Inomata | |
| 8,614,934 B1 | 12/2013 | Tomikawa et al. | |
| 8,625,224 B1 | 1/2014 | Lin et al. | |
| 8,854,929 B1 | 10/2014 | Champion et al. | |
| 2012/0120522 A1* | 5/2012 | Johnson | G11B 5/607 360/75 |
| 2013/0077453 A1* | 3/2013 | Alex | G11B 5/02 369/13.26 |

OTHER PUBLICATIONS

Dec. 10, 2015, File History for U.S. Appl. No. 14/716,171.

* cited by examiner

*Primary Examiner* — Brian Butcher
(74) *Attorney, Agent, or Firm* — Hollingsworth Davis, LLC

(57) ABSTRACT

A change in an optical energy profile of energy emitted from a read/write head is determined. The read/write head includes an optical transmission path that emits the energy to heat a heat-assisted recording medium during writing. A change in optical efficiency of the read/write head is also determined. Based on the change in the optical energy profile and the change in the optical efficiency, a change in the effectiveness of the read/write head is determined, and in response a mitigation is performed.

18 Claims, 6 Drawing Sheets

DETERMINING OPTICAL DEGRADATION IN A HEAT-ASSISTED READ/WRITE HEAD

SUMMARY

The present disclosure is directed to determining optical degradation in a heat-assisted read/write head. In one embodiment, a change in an optical energy profile of energy emitted from a read/write head is determined. The read/write head includes an optical transmission path that emits the energy to heat a heat-assisted recording medium during writing. A change in optical efficiency of the read/write head is also determined. Based on the change in the optical energy profile and the change in the optical efficiency, a change in the effectiveness of the read/write head is determined, and in response a mitigation is performed.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

Generally, the NFT is formed by depositing thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein the determine the effectiveness of the read/write head has been affected/changed by the quality of a particular NFT (and other optical elements) and attempt to mitigate negative impacts on drive performance caused by the changes.

Figure 1:
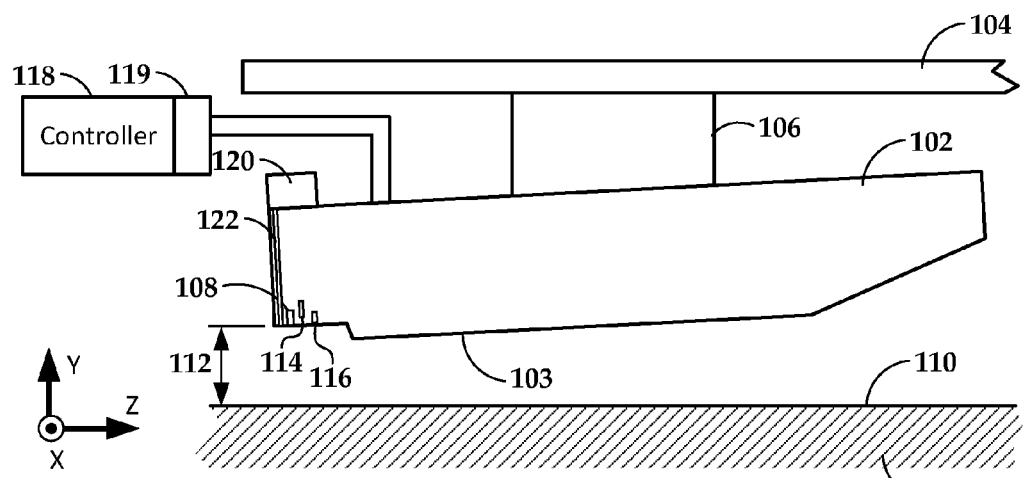
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

The spacing between the read/write transducers 108 and the media surface 110 may be adjusted via one or more heaters 114 and sensors 116. Generally, the heater 114 induces a protrusion near the read/write transducers 108 due to thermal expansion of the surrounding material. By adjusting a current supplied to the heater 114, the clearance during reading and writing can be finely adjusted. The sensor 116 may be, e.g., a temperature-dependent coefficient of resistance sensor, that allows measuring temperature near the protrusion point. A controller 118 uses these sensor measurements to control clearance during operation.

The controller 118 is coupled to the read/write transducers 108, as well as other components of the read/write head 102, such as heaters 114, sensors 116, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
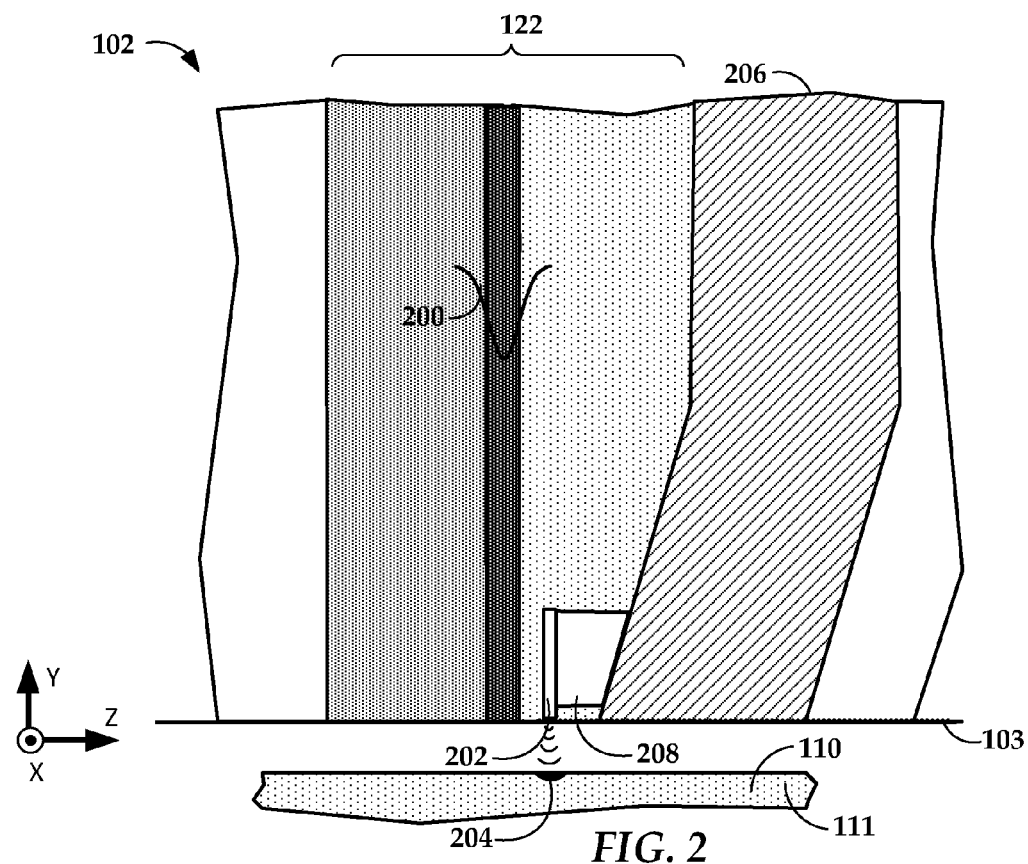
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, methods and apparatuses described herein facilitate determining the quality of an NFT and/or related optical components.

Figure 3:
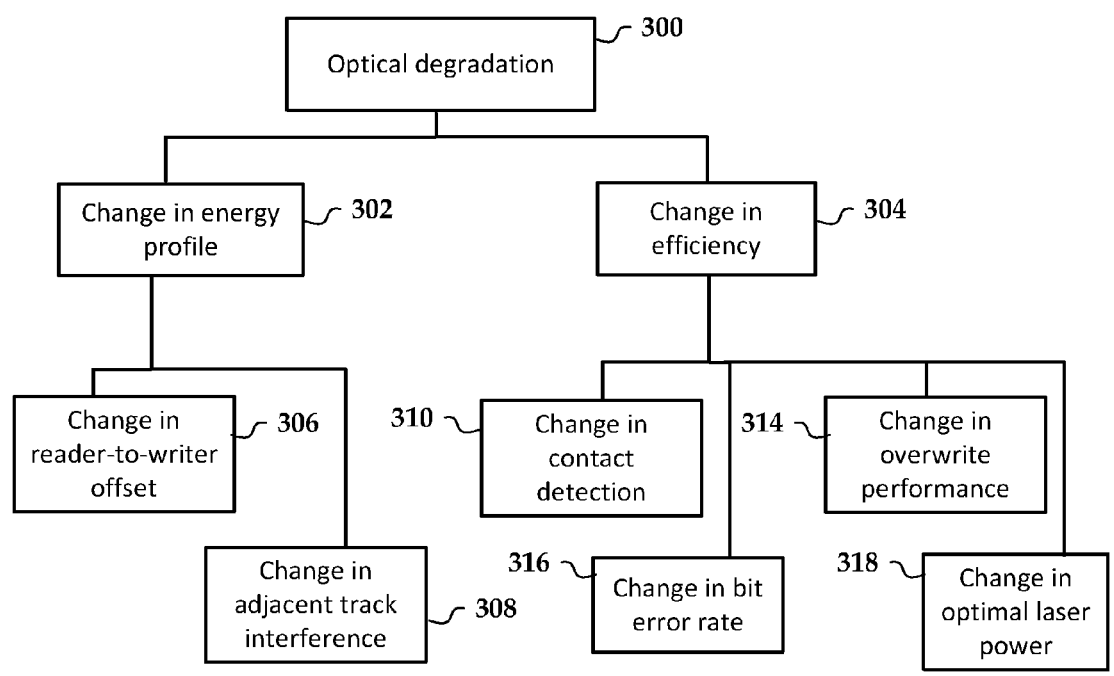
FIG. 3 is a block diagram that lists effects that may be caused by optical degradation according to an example embodiment.

Generally, a method involves examining measurable effects that may be indicative of a reduction in quality of the NFT and other optical components. The NFT of a HAMR drive can dictate a number of system performance parameters, such as track width, power consumption, and the reliability of the drive. In FIG. 3, a block diagram illustrates a number of effects that may be caused by optical degradation 300. Optical degradation may be due to physical wear, heat effects, material changes, etc., and/or manufacturing defects. The degraded components include any combination of NFTs, waveguides, heat sinks, lasers, mirrors, phase shifters, mode changers, lenses, etc. For purposes of illustration, the degradation is broken into two categories, changes in energy profile 302 and changes in efficiency 304. It will be understood that these categories and other sub-categories discussed below need not be mutually exclusive. For example, a change in energy profile 302 may also cause a change in efficiency 304, and vice versa. However, these categories of degradation may also be independent and therefore manifest themselves differently.

A change in the energy profile 302 may be seen as a different distribution of energy over some measure of distance, area, or volume. For example, if the NFT becomes misshapen, it may result a mis-directed hotspot on the recording medium. This may be detected via a change in reader-to-writer offset (RWO) 304 in the cross-track direction changes. It is believed that NFT rounding at the ABS causes the RWO to change. Therefore, any change in RWO could be attributed to a failing NFT. As will be described below, the change in RWO can be detected by writing test tracks. Another effect of the change in energy profile 302 is a change in adjacent track interference. When a NFT fails, it may no longer be able to write a narrow track. A mis-direction of the energy emitted from the NFT may also cause increase in ATI on one side of a track. As will be described in detail below, NFT failure can be inferred by testing ATI and determining if ATI exceeds a threshold.

It should also be noted that the change in RWO 306 may also include a change a downtrack RWO as well as or instead of the cross-track RWO noted above. This downtrack offset will generally not cause off-track-center writing, but it may affect the ability of the servo system to detect user data. For example, data sectors may include a known preamble that is used by the decoder to detect the start of the data. A downtrack offset may cause timing of these written-in preambles to change relative to servo marks that the system uses as time references, and this can cause errors when attempting to read back data. In such a case, mitigation may involve adjusting timing of the read channel.

The category of changes in optical efficiency 304 generally refers to a change in the total amount of energy delivered to the recording medium via the recording head for a given laser input. For example, a change in efficiency can result in more or less energy being absorbed at or near the NFT, which can result in contact detection changes 312. Generally, a read/write head uses a heater to finely control head-to-media spacing (HMS). The heater causes a local thermal expansion at the ABS near the read and/or write transducer, thereby varying the effective HMS between the transducers and the medium. The HMS can be measured during device operation via a thermal sensor located at or near the ABS. A controller can track the temperature measurements as a function of heater power, and a change in this temperature profile can be used to detect clearance and/or head-to-media contact.

The heat generated at or near the NFT contributes to thermal expansion at the ABS, and so change NFT efficiency may be detected by a change in net heater power needed to induce contact and/or maintain a desired HMS. Heater power will generally change constantly during operation to maintain a desired HMS. Further, the amount of heater power used may be affected by environmental conditions and operating parameters, so the net change in power used to assess optical degradation should be averaged over a sufficient period of time and number of operating conditions to account for these variations. It should be noted that the heater or heaters are used to control HMS during both writing and reading, and so a net change in heater power for writing that is not present during reading is indicative of optical degradation. If the change to heater power is seen in both reading and writing, then it may be due to some other cause. The above-mentioned thermal sensor can be used to detect this change, e.g., via a change in power needed to induce contact during writing.

One side effect of changes in optical efficiency 304 is a change in recording effectiveness, which may be detected as a change in overwrite performance 314. Overwrite involves writing a tone at a first frequency over a track and then writing over the track with a tone at a second frequency. For example, the first tone frequency may be written in a known good state of the read/write head. Afterwards (e.g., when degradation is suspected), the same track is overwritten with the second tone is read back to detect how much of the original tone can be detected. Overwrite performance is inverse to how much of the original tone is detected. For example, if the NFT is writing poorly, an increased amount of the original signal will be detected when compared to a healthy NFT. A similar effect that may be caused by changes in optical efficiency 304 is a change in bit error rate (BER) 316. Generally, an NFT that is writing poorly will see an overall increase in BER when reading back the recorded data.

A change 318 in optimal laser power may also indicate optical degradation. Periodically during the life of the drive, the laser will be re-calibrated to adjust laser power. If the optimal laser power changes 318, this may be due to a component in the optical transmission path having changed. However, there are other causes which can impact laser power which may not be attributed to the NFT. For example, the laser efficiency can change, thereby requiring more input current to achieve the same level of optical illumination. Other sensors (e.g., a photodiode located with the laser) may be used to diagnose whether changes 318 in power are due to the laser or the transmission path.

It will be understood that, although any one of the effects shown in FIG. 3 may be indicative of optical degradation, some of the effects may have other causes. A diagnosis of a failed optical component may be more reliable if multiple ones of the effects are detected. Further, the particular effects may provide clues of which component has failed. For example, if there are changes in overwrite 314, BER 316, and optimal laser power 318, but no change or minimal change in contact detection, 310, RWO 306, and ATI 308, then the problems may lie with the laser or optical transmission path between the laser and the NFT. Other measurements, such as a photodiode measurement, may be used to determine whether it is the laser or the transmission path that has caused the change. Similarly, a change in RWO 306 and ATI 308 without any changes (or minimal changes) in efficiency 304 may indicate an NFT has become misshapen but without affecting net energy delivery efficiency.

Figure 4:
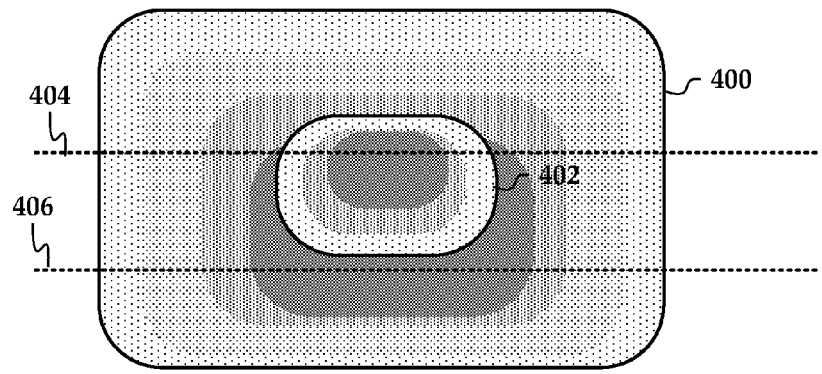
FIG. 4 is a block diagram illustrating how a degraded near-field transducer affects writing of data to a recording medium according to an example embodiment.

In FIG. 4, a block diagram illustrates how an NFT that exhibits a change in energy profile 302 may affect writing to a recording medium. Block 400 is represents a magnetic field applied to a recording medium at an instant of time via a HAMR read/write head. Block 402 represents a hotspot applied by an NFT of the read/write head during the same instant of time when writing to the recording medium. Lines 404 and 406 are intended to represent boundaries of a track to which the read/write is attempting to write data via the magnetic field 400 and hotspot 402. The boundaries represent the cross-track location where the read transducer will later attempt to read the track. It should be noted that the objects of this diagram are not necessarily to scale, but intended to indicate that the hotspot 402 is significantly smaller than the coverage of the magnetic field 400.

The different shading within the magnetic field 400 is intended to represent variations of the magnetic field. Similarly, different shading within the hotspot 402 is intended to represent different temperatures to which the recording medium is heated. The extents of the hotspot 402 are much smaller than that of the magnetic field 400 and define the bits of the written data. The characteristics of the hotspot 402 will dominate various parameters of the recorded data, such as track width, sharpness of field transitions, field strength along track centerline, adjacent track interference, etc. While the magnetic field 400 may also have variations, the field 400 outside of the hotspot 402 will have little or no effect on the recording medium because the regions outside of the hotspot 400 are below the Curie temperature, and therefore have higher magnetic coercivity than the hotspot 400.

In the illustrated example, the hotspot 402 is shifted in the cross-track direction (vertical direction in the view of FIG. 4). This shifting can be indicative of defects in the NFT and/or associated optical components, and may be manifested as a change in RWO 306 and/or a change in ATI 308 as discussed with reference to FIG. 3. As noted above, the lines 404, 406 indicate the expected location of the track, the read head may have difficulty reading back the signal depending on the magnitude of the shift, leading to other effects, e.g., change in bit error rate. Accordingly, a method may be performed to determine if the written track has shifted from its expected location. An example of the method is shown in the flowchart of FIG. 5.

Figure 5:
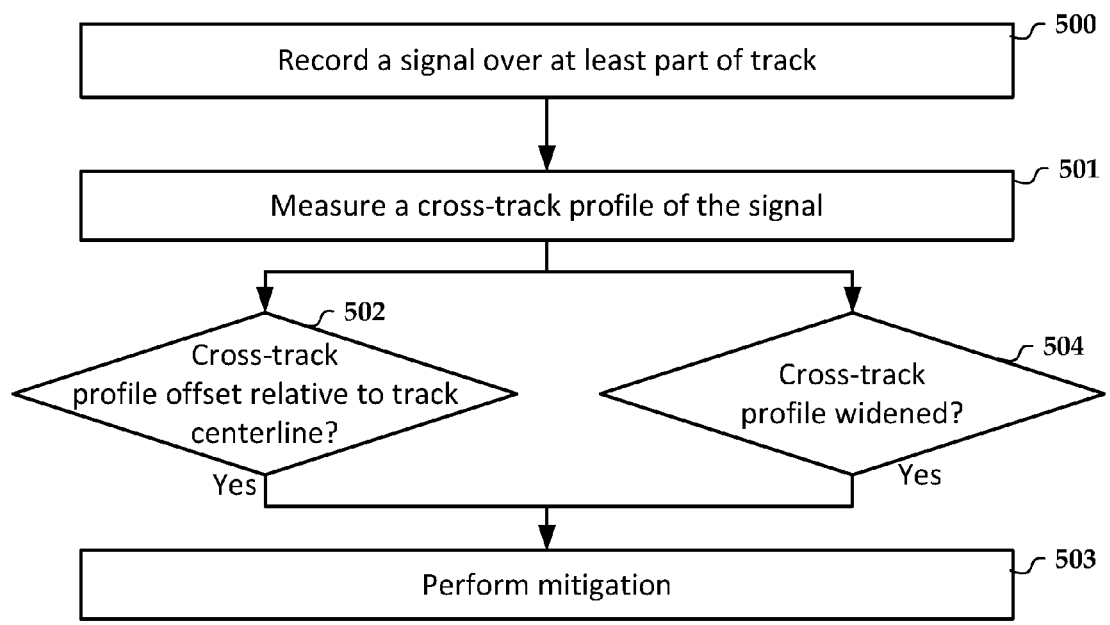
FIG. 5 is a flowchart illustrating a method according to an example embodiment.

The method shown in FIG. 5 involves writing 500 a signal over at least part of a track on a heat-assisted recording medium via a heat-assisted magnetic recording head. A cross-track profile of the recorded signal is measured 501. The profile may include strength of magnetic field transitions that are detected when reading the data, amplifier gain used in processing the signal, a signal-to-noise ratio of the signal, bit error rate of the signal, etc. If it is determined 502 that a location of the cross-track profile is offset relative to a track centerline (which is indicative of RWO), the mitigation 503 is performed. For example, the servo system can compensate by adjusting the head appropriately during recording to compensate for offset. Another determination 504 is made as to whether the profile is widened at block 504. If so, mitigation 503 is also performed, although likely different mitigation than if the profile were offset. For example, the laser power may be reduced to prevent adjacent track erasure, newly written regions may utilize a larger track spacing, etc. Both determinations 502, 504 may be made independently, and the mitigation 503 may include mitigation for one or both types of changes in the track profile.

In order to perform the indicated measurement 501, an output of a variable gain amplifier (VGA) in the read channel may be used. Generally, a read head obtains an analog signal from a sensor (e.g., magnetoresistive sensor) that is held over a moving recording medium. The peak amplitude of the signal may vary based on a number of factors (e.g., tracking, media variations, degradation of the field, etc.) and so the VGA is used to amplify the signal to a desired level before it is processed by a read channel, which may include, among other things, an analog-to-digital converter (ADC) and a decoder. Lower signal level will require higher gain, and so the shape of the VGA curve is inverse that of the recorded signal strength.

The hotspot created by a HAMR write head will transition from the ambient temperature of the recording medium near the edges of the hotspot to a maximum value, which may be generally located at or near the center of the hotspot. The magnetic transitions of the recorded data will generally be stronger along the region of maximum recording temperature near the center of the hotspot, as will the electrical signals detected by the read sensor. The electrical signals will gradually decrease in amplitude away from the center of the hotspot and track. A cross-track profile of the signals can be detected and characterized by reading a track at small crosstrack offsets and looking at the gain of the VGA when decoding the track. The crosstrack offsets are obtained by commanding a servo system that positions the read/write head in the crosstrack direction to make small, cross-track, offsets in the position of the read/write head during each pass over the same track. Generally, the VGA will have the lowest level of amplification along the center of the track (or any other cross-track location where the magnetic flux transitions are highest) and gradually increase as the read head is moved off-track-center.

Figure 6:
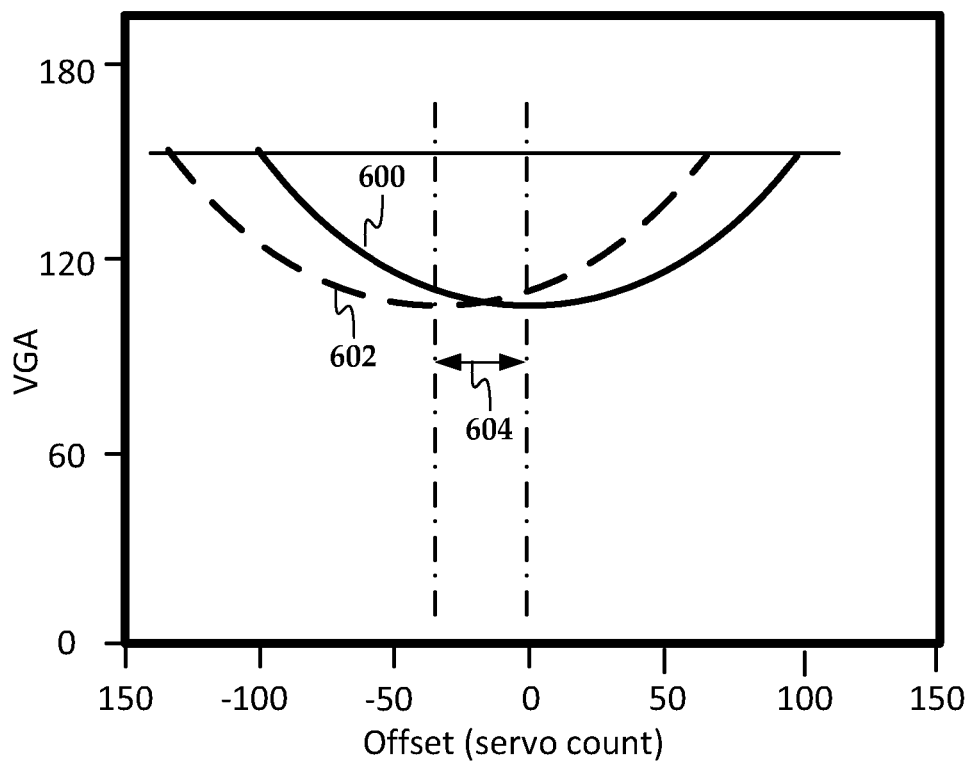
FIGS. 6 and 7 are graphs illustrating a measured changes to cross-track profile according to an example embodiments.

In reference now to FIG. 6, a graph shows example VGA measurements that may be used to determine an offset cross-track profile according to an example embodiment, e.g., used in the determination 502 in FIG. 5. The graph plots VGA amplification level (expressed as a digital input value to the VGA) versus a cross track offset (expressed as digital servo count values). The curves in the graphs are generally the inverse of the recorded signal strength, and include plots of a nominal (e.g., within specification) VGA response 600 and a shifted response 602. The center-to-center distance 604 between the responses 600, 602 indicates a change in RWO. It will be understood that the nominal response 600 may be assumed to be centered over the zero servo offset, such that shifting of the response can be determined by measuring servo count value at the minimum VGA of response 602.

Figure 7:
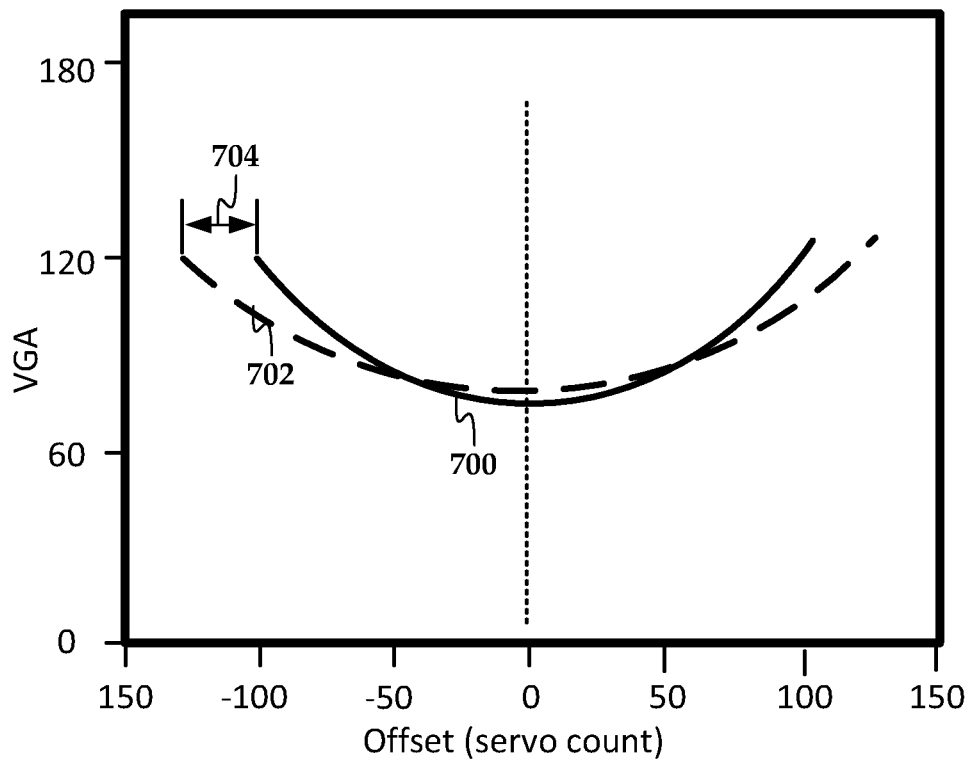

In reference now to FIG. 7, a graph shows example VGA measurements that may be used to determine a change in energy profile of a HAMR read/write head according to an example embodiment, e.g., used in the determination 504 in FIG. 5. The graph plots VGA amplification level versus a cross track offset similar to FIG. 6. A nominal (e.g., within specification) VGA response 700 is shown together with a broadened response 702. The widths of the curves are different, as generally indicated by difference 704 at edges of the curves. In this case, the curves 700, 702 show no change in RWO, although it is possible that the profile may be shifted in addition to being broadened.

In other embodiments, the cross-track profile of the recorded signal may be measured indirectly by analyzing cross-track values of bit error rate (BER) versus servo offset of the recording head. The read channel may be configured to provide measures of BER to an analysis module. In such a case, the cross track BER curves may be similar in shape as that shown in FIGS. 6 and 7 (e.g., with a minimum value near the track center), and profile changes may be measured in similar ways. In yet other embodiments, the amplitude of the signal versus servo offset of the recording head may be measured directly (e.g., via an oscilloscope, read channel, etc.) instead of using the VGA gain. Such measurements may provide data sets similar to those shown in FIGS. 6 and 7, except the vertical axis would be a measure of signal strength (e.g., signal-to-noise ratio) and the resulting curves would be inverted such that a maximum value would be seen near the track center. The profile changes in such a case may be measured in similar ways as described above.

In the example, described above, the profile measurements may be made at one particular zone or over different zones. For example, a zone-dependent measurement of RWO can be used to verify the amount of RWO across the stroke of the disc. The zone-specific RWO is a function of skew and downtrack reader-to-writer separation, as well as any RWO changes caused by optical degradation. Accordingly, the amount of servo compensation for RWO changes may be zone-specific. Similarly, the cross-track profile width may be zone or region specific, varying as a function of skew.

Figure 8:
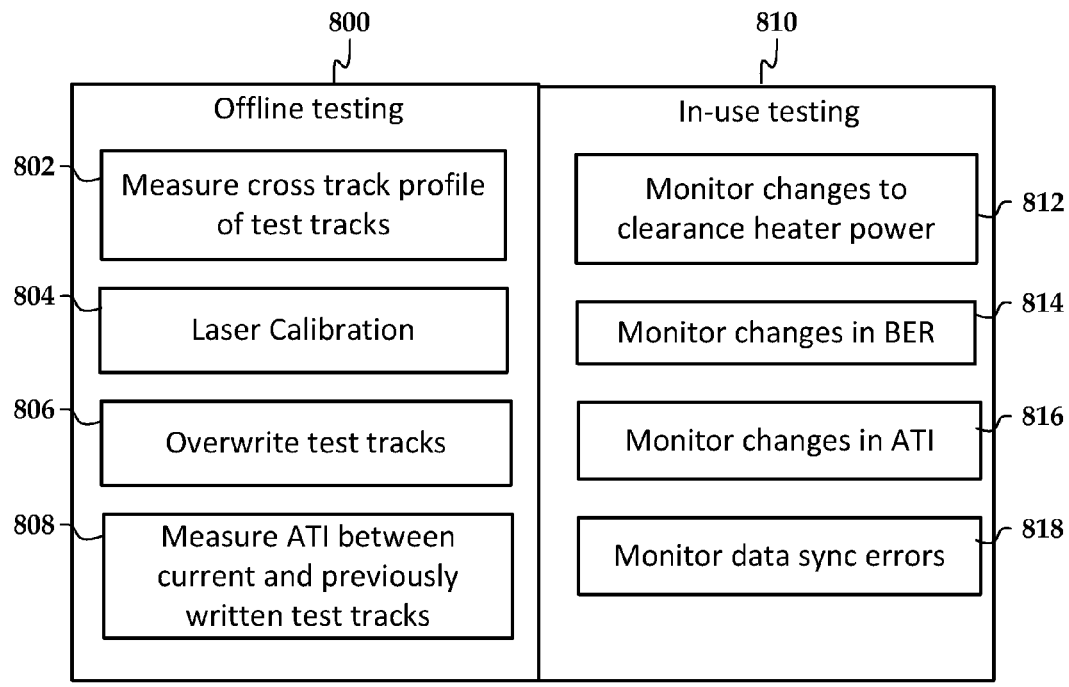
FIG. 8 is a block diagram illustrating different types of test used in an apparatus according to an example embodiment.

In FIG. 8, a block diagram shows different types of test procedures according to an example embodiment, generally divided into offline testing 800 and in-use testing 810. The procedures shown in FIGS. 5-7 may be considered as "offline," as the cross-track scanning of tracks is time consuming and the use of test tracks may require dedicated regions of storage not made available for storing user data. As such, the offline testing may occur during times of low utilization and/or in response to an explicit user command. As shown in FIG. 8, the measurement 802 of cross-track profiles is just one example of offline testing 800. Other examples include laser calibration 804, overwriting 806 of tones on test tracks and measuring 808 of ATI on test tracks. The latter measurement 808 may involve writing a test track (e.g., a first tone frequency) on one or both sides of a previously written test track (e.g., second and possibly third test tone frequency) of known good alignment, and seeing if the newly written track signals can be detected in the previously written track. As noted above, if an RWO condition is found, it can be corrected by servo adjustments. After verification of the adjustments, the read/write head can overwrite the test track to be used at a later time as a known good track.

Some effects of optical degradation in an HAMR read/write head can be determined in use, e.g., while reading and writing user data. This type of in-use testing may include monitoring 812 changes to clearance heater power, monitoring changes in BER 814, monitoring changes in ATI 816, and monitoring data sync errors 818. In this latter case, the ATI is measured 816 while reading back user data instead of test data in the offline ATI test 808.

Figure 9:
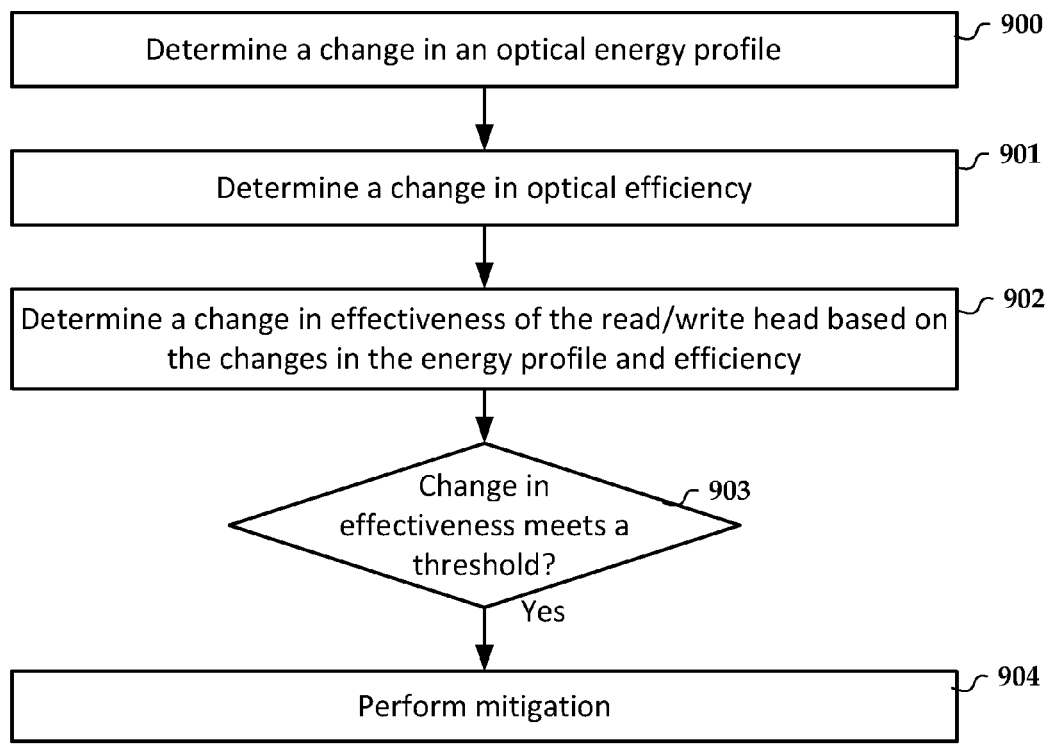
FIG. 9 is a flowchart illustrating a method according to an example embodiment.

As noted above, different optical degradation indicators can be monitored while in-use and using offline testing. Generally, a device may make a number of different measurements to determine an overall change of effectiveness of the optical components. For example, each measure can be occasionally taken and combined (e.g., weighted average) into one or more effectiveness indicators. In combination, the measurements may provide an indication of whether the change is sufficient to merit mitigation, and also what form the mitigation should take. In FIG. 9, a flowchart illustrates an example of a method according to one such embodiment.

The method involves determining 900 a change in an optical energy profile emitted from a read/write head. The read/write head includes an optical transmission path that facilitates writing to a heat-assisted recording medium. A change in optical efficiency of the read/write head is also determined 901. A change in effectiveness of the read/write head is determined 902 based on the change in the optical energy profile and the change in the optical efficiency. If the change in effectiveness meets a threshold as determined at block 904, mitigation is performed 904 in response to the change in effectiveness.

Figure 10:
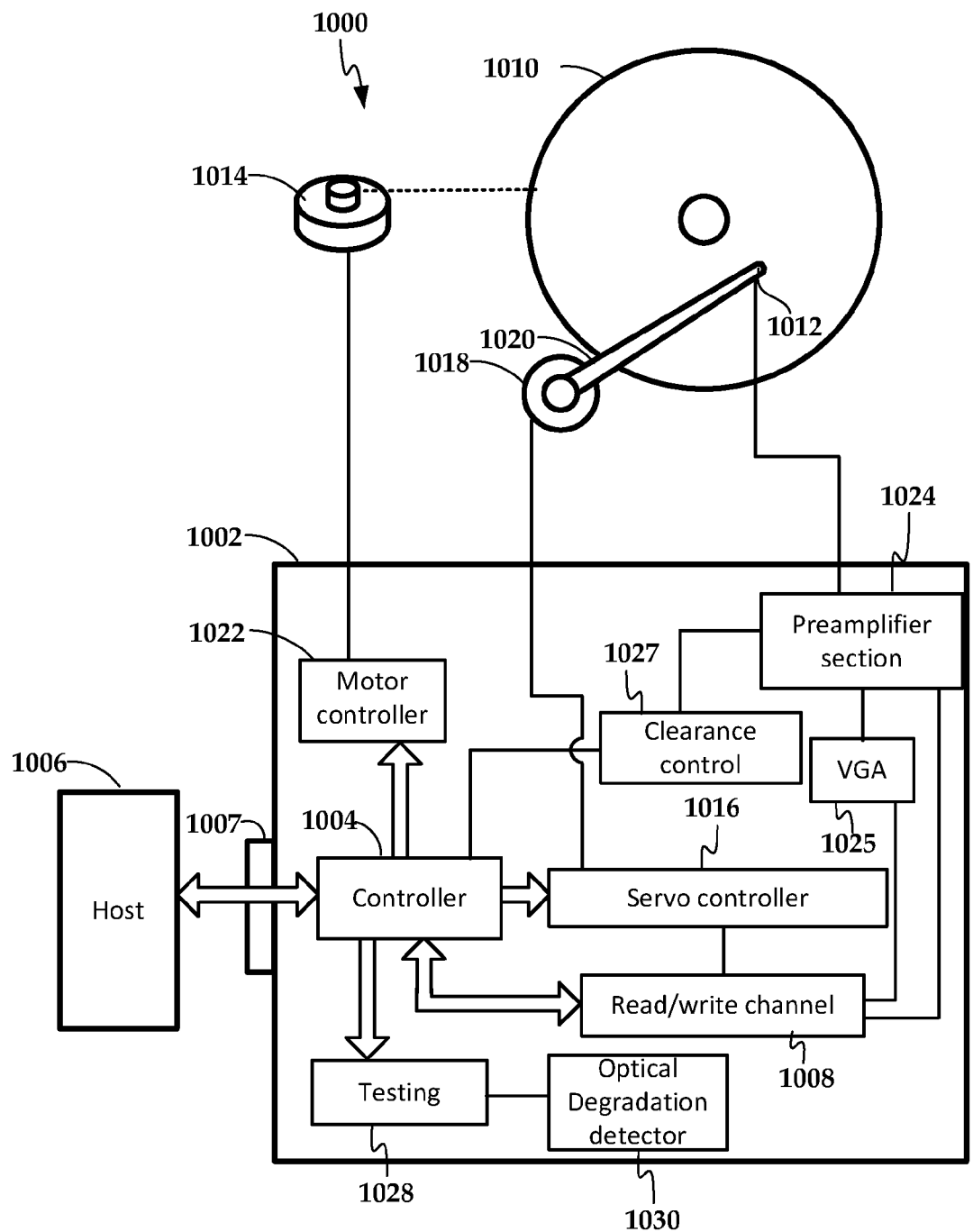
FIG. 10 is a block diagram of an apparatus according to an example embodiment.

In reference now to FIG. 10, a block diagram illustrates components of system 1000 according to an example embodiment. The system 1000 may be part of a test stand or include a fully-assembled hard drive. The system 1000 includes circuitry 1002 coupled to one or more read/write heads 1012 that may ultimately be used in a hard drive. The circuitry 1002 includes a controller 1004 that controls a number of functions of the system 1000, optionally including communications between the circuitry 1002 and a host device 1006 via a host interface 1007. The host device 1006 may include any electronic device that can be communicatively coupled to communicate with the circuitry 1002, e.g., a general-purpose computer, a factory test bench, remote terminal, etc.

The controller 1004 may include any combination of custom logic circuits, application specific integrated circuits (ASICs), general-purpose central processing unit (CPU), interface circuits, and may utilize instructions stored as firmware and/or software. The controller 1004 may read data from and write data to a recording medium (e.g., disk 1010) via a read/write channel 1008. The controller 1004 may, among other things, determine a location on the disk 1010 for the desired data, move the heads to the location (track) of the data, read or write the data via the read/write channel 1008, correct errors, transfer the data to/from the host 1006, etc.

The read/write channel 1008 converts data between the digital signals processed by the data controller 1004 and the analog signals conducted through read/write heads 1012. The read/write channel 1008 also provides servo data read from the disk 1010 to a servo controller 1016. The servo controller 1016 uses these signals to drive an actuator 1018 (e.g., voice coil motor) that rotates an arm 1020, upon which the read/write heads 1012 are mounted. The heads 1012 are moved radially across different tracks of the disk(s) 1010 by the actuator motor 1018 (e.g., voice coil motor), while a spindle motor 1014 rotates the disk(s) 1010. A microactuator (not shown) may also be included to provide finer tracking control, and also receives inputs from the servo controller 1016. The controller 1004 controls the spindle motor 1014 by way of a motor controller 1022.

During write operations, the read/write channel 1008 provides analog signals that are delivered to the read/write heads 1012 by way of a preamplifier section 1024. The preamplifier section 1024 amplifies and conditions the write signals sent to write coils of the read/write heads 1012. In the illustrated embodiment, the preamplifier section 1024 also includes circuitry that energizes a laser (or other energy source) at each of the read/write heads 1012 during write operations. The laser preamplifier conditions the signals to ensure the lasers provide sufficient energy to heat a spot on the disk 1010 as it is being recorded.

The read/write heads 1012 may also each include one or more heaters and one or more temperature sensors (see, e.g., FIG. 1). The preamplifier section 1024 may also process signals sent to the heater and signals received from the temperature sensors. A clearance control module 1027 adjusts clearance between read and write transducers of the read/write heads 1012 and the disks 1010. The clearance control module 1027 may at least detect changes in clearances via the sensors and control the clearances in response via the heaters.

A VGA 1025 receives electrical signals from one or more of the read/write heads 1012 via the preamplifier section 1024 during read operations. The VGA 1025 provides a variable amount of gain so that the signal has sufficient amplitude without saturation for use by the read/write channel 1008. A testing module 1028 is operable by the controller to perform testing operations, e.g., during a design, manufacturing, and/or operational phase of a hard disk. The testing module 1028 may perform in-use data collection and offline testing as described above. As indicated by optical degradation detection module 1030, the testing module 1028 is used to measure (e.g., via the VGA 1025, read/write channel 1008, clearance control module 1027, or other hardware not shown such as an oscilloscope) indicators from one or more tracks written to the disk 1010. This testing may at least be used to determine changes in optical energy profile and optical efficiency, and thereby determine a change in effectiveness of the read/write heads 1012 in writing to the disk 1010.

In one example of the testing, the servo controller 1016 and read/write channel 1008 are commanded to record a signal to at least part of a track on the disk(s) 1010 using each of the read/write heads 1012. These track portions may include a known pattern of data to facilitate more easily decoding the data later on. The servo controller 1016 then reads back the parts of the tracks using multiple passes, while offsetting the respective read/write head 1012 different amounts relative to the track centerline for each of the passes. For each of the passes, a measured value a function of servo offset may be recorded by the optical degradation detection module 1030 to form a cross-track profile. The measured value may include any combination of the amount of gain used by the VGA 1025 to read the data, signal-to-noise ratio of the signal, and bit error rate seen by the read write channel.

This measurement and recording of data may be repeated for each of the read/write heads 1012, and may be performed at multiple zones spread across the disk(s) 1010. The cross-track profiles may be analyzed as described above (e.g., tested against a threshold, averaged or otherwise combined) and used to qualify the read/write head 1012, e.g., determine a change in effectiveness, diagnose performance issues, provide mitigation, etc.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    determining a change in an optical energy profile of energy emitted from a read/write head comprising at least one of determining a change in a reader-to-writer crosstrack offset and determining a change in adjacent track interference, the read/write head comprising an optical transmission path that emits the energy to heat a heat-assisted recording medium during writing;
    determining a change in optical efficiency of the read/write head;
    determining a change in effectiveness of the read/write head based on the change in the optical energy profile and the change in the optical efficiency; and
    performing a mitigation in response to the change in effectiveness.

2. The method of claim 1, wherein the change in the optical efficiency comprises a change in at least one of: power applied to a heater that controls head-to-media spacing, change in overwrite performance, change in bit error rate, and change in optimal laser power.

3. The method of claim 1, wherein the change in the optical energy profile results in a reader-to-writer crosstrack offset, and wherein the mitigation involves adjusting a write position via a servo controller to compensate for the reader-to-writer crosstrack offset.

4. The method of claim 1, wherein the change in the optical energy profile results in an increase in a width of the written tracks, and wherein the mitigation involves at least one of reducing a laser power of the read/write head and adjusting a track spacing for subsequently written tracks.

5. The method of claim 1, wherein determining the change in the optical energy profile comprises determining a change in a cross-track profile of a test track.

6. The method of claim 5, wherein determining the change in the cross-track profile of the test track comprises measuring at least one of variable gain amplifier gain, bit error rate, and signal strength as a function of servo offset.

7. The method of claim 1, wherein the change in the optical energy profile results in a reader-to-writer downtrack offset, and wherein the mitigation involves adjusting a timing of a read/write channel.

8. The method of claim 1, wherein the optical transmission path comprises a near-field transducer, and wherein the change in effectiveness is due to degradation of the near-field transducer.

9. An apparatus comprising:
a read/write channel configured to communicate with a read/write head comprising an optical transmission path that emits energy to heat a heat-assisted recording medium during writing; and
a controller coupled to the read/write channel and configured to:
determine a change in an optical energy profile of the energy emitted from the read/write head comprising at least one of determining a change in a reader-to-writer crosstrack offset and determining a change in adjacent track interference;
determine a change in optical efficiency of the read/write head;
determine a change in effectiveness of the read/write head based on the change in the optical energy profile and the change in the optical efficiency; and
perform a mitigation in response to the change in effectiveness.

10. The apparatus of claim 9, wherein the change in the optical efficiency comprises a change in at least one of: power applied to a heater that controls head-to-media spacing, change in overwrite performance, change in bit error rate, and change in optimal laser power.

11. The apparatus of claim 9, wherein the change in the optical energy profile results in a reader-to-writer crosstrack offset, and wherein the mitigation involves adjusting a write position via a servo controller to compensate for the reader-to-writer crosstrack offset.

12. The apparatus of claim 9, wherein the change in the optical energy profile results in an increase in a width of the written tracks, and wherein the mitigation involves at least one of reducing a laser power of the read/write head and adjusting a track spacing for subsequently written tracks.

13. The apparatus of claim 9, wherein determining the change in the optical energy profile comprises determining a change in a cross-track profile of a test track, and wherein determining the change in the cross-track profile of the test track comprises measuring at least one of variable in amplifier gain, bit error rate, and signal strength as a function of servo offset.

14. The apparatus of claim 9, wherein the change in the optical energy profile results in a reader-to-writer downtrack offset, and wherein the mitigation involves adjusting a timing of a read/write channel.

15. The apparatus of claim 9, wherein the optical transmission path comprises a near-field transducer, and wherein the change in effectiveness is due to degradation of the near-field transducer.

16. A method comprising:
writing a track on a heat-assisted recording medium via an optical transmission path of a magnetic recording head;
determining a net change in power applied to a heater that controls a spacing between the recording head and the recording medium during the writing;
determining a change in effectiveness of the optical transmission path based on the net change in the power; and
performing a mitigation based on the change in effectiveness.

17. The method of claim 16, wherein the optical transmission path comprises a near-field transducer, and wherein the change in effectiveness is due to degradation of the near-field transducer.

18. The method of claim 16, wherein the mitigation is performed only if the net change in power occurs during writing and not during reading.

* * * * *